(12) United States Patent
Scheid (10) Patent No.: US 11,492,132 B2
(45) Date of Patent: Nov. 8, 2022

(54) GAS TURBINE ENGINE CONFIGURATION DATA SYNCHRONIZATION WITH A GROUND-BASED SYSTEM

(71) Applicant: United Technologies Corporation, Farmington, CT (US)

(72) Inventor: Paul Raymond Scheid, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 440 days.

(21) Appl. No.: 16/502,079

(22) Filed: Jul. 3, 2019

(65) Prior Publication Data
US 2020/0331620 A1 Oct. 22, 2020

Related U.S. Application Data

(60) Provisional application No. 62/835,169, filed on Apr. 17, 2019.

(51) Int. Cl.
*B64D 31/06* (2006.01)
*H04L 9/40* (2022.01)
*G06F 16/23* (2019.01)

(52) U.S. Cl.
CPC ......... *B64D 31/06* (2013.01); *G06F 16/2379* (2019.01); *H04L 63/0209* (2013.01)

(58) Field of Classification Search
CPC ..... B64D 31/06; B64D 31/00; H04L 63/0209; H04L 9/50; G06F 16/2379; Y02T 50/60;
(Continued)

(56) References Cited

U.S. PATENT DOCUMENTS 6,167,239 A 12/2000 Wright et al.
6,173,159 B1 1/2001 Wright et al.
(Continued)

FOREIGN PATENT DOCUMENTS

EP 1400942 A2 3/2004
EP 2378490 A1 10/2011
(Continued)

OTHER PUBLICATIONS

Cfmi Customer Training Center Snecma: Training Manual CFM56-5A Engine Systems; dated Apr. 1, 2020; https://eduscol.education.fr/sti/sites/eduscol.education.fr.sti/files/ressources/pedagogiques/11659/11659-ctc-045-engine-systems.pdf; 467 pages.
(Continued)

*Primary Examiner* — Javier O Guzman
(74) *Attorney, Agent, or Firm* — Cantor Colburn LLP (57) ABSTRACT

A system includes an engine manufacturer database communicatively coupled to a blockchain database through a network and a ground station configured to wirelessly communicate with a communication adapter of a gas turbine engine of an aircraft. The communication adapter includes a communication interface configured to communicate with an engine control of a gas turbine engine. The system is further configured to monitor the blockchain database for a configuration update associated with the aircraft and update the engine manufacturer database based on the configuration update. The system is further configured to command a synchronization of the configuration update from the engine manufacturer database to a communication adapter of the gas turbine engine tracked by the engine manufacturer database and transmit the configuration update wirelessly to the communication adapter through the communication interface to update a data storage unit of the gas turbine engine with the configuration update.

17 Claims, 4 Drawing Sheets

(58) Field of Classification Search
CPC .... F05D 2260/80; F05D 2260/81; F02C 9/28; B64F 5/60
See application file for complete search history.

(56) References Cited

U.S. PATENT DOCUMENTS

| | | | |
|---|---|---|---|
| 8,078,354 | B2 | 12/2011 | Loda |
| 8,344,912 | B2 | 1/2013 | Mitchell et al. |
| 8,768,537 | B2 | 7/2014 | Kim et al. |
| 9,253,816 | B1 | 2/2016 | Gashette |
| 9,303,523 | B2 | 4/2016 | Rodriguez et al. |
| 9,367,970 | B2 | 6/2016 | Ziarno |
| 9,435,819 | B1 | 9/2016 | Fraley et al. |
| 9,464,905 | B2 | 10/2016 | Lewis |
| 9,587,576 | B2* | 3/2017 | Stanek .................... F02D 41/26 |
| 9,915,535 | B2 | 3/2018 | Jordan et al. |
| 10,035,609 | B2 | 7/2018 | Ziarno |
| 10,093,436 | B2 | 10/2018 | Bulumulla et al. |
| 10,114,634 | B2 | 10/2018 | Quin et al. |
| 10,444,748 | B2 | 10/2019 | Feenstra et al. |
| 10,633,106 | B2 | 4/2020 | Gelwan et al. |
| 10,880,070 | B1* | 12/2020 | Delaney ................ H04L 9/3239 |
| 2001/0038143 | A1 | 11/2001 | Sonobe et al. |
| 2004/0056766 | A1* | 3/2004 | Butz ......................... F02C 9/00 340/539.1 |
| 2004/0206818 | A1 | 10/2004 | Loda et al. |
| 2005/0017876 | A1 | 1/2005 | Ziarno |
| 2006/0108988 | A1 | 5/2006 | McKelvey et al. |
| 2009/0049441 | A1 | 2/2009 | Mii et al. |
| 2009/0119657 | A1 | 5/2009 | Link, II |
| 2010/0049377 | A1 | 2/2010 | Scheid et al. |
| 2013/0006581 | A1 | 1/2013 | Singh et al. |
| 2013/0332011 | A1 | 12/2013 | Ziarno |
| 2013/0332025 | A1 | 12/2013 | Ziarno |
| 2014/0123625 | A1 | 5/2014 | Snell |
| 2015/0330869 | A1 | 11/2015 | Ziarno |
| 2016/0110179 | A1 | 4/2016 | Weckesser et al. |
| 2016/0178464 | A1 | 6/2016 | Burns et al. |
| 2016/0196457 | A1 | 7/2016 | Mylaraswamy et al. |
| 2016/0207639 | A1 | 7/2016 | Ellis et al. |
| 2016/0222889 | A1 | 8/2016 | Snyder |
| 2016/0260265 | A1 | 9/2016 | Buehler et al. |
| 2016/0322826 | A1 | 11/2016 | Okino et al. |
| 2016/0377506 | A1 | 12/2016 | Bizud |
| 2017/0089577 | A1 | 3/2017 | Desilva et al. |
| 2017/0155514 | A1 | 6/2017 | Schulz et al. |
| 2017/0205817 | A1 | 7/2017 | Lyons et al. |
| 2017/0234233 | A1 | 8/2017 | Schwarz et al. |
| 2017/0259942 | A1 | 9/2017 | Ziarno |
| 2017/0287239 | A1 | 10/2017 | Levy |
| 2017/0334576 | A1 | 11/2017 | Shams |
| 2017/0373612 | A1 | 12/2017 | Sellinger et al. |
| 2018/0006916 | A1 | 1/2018 | Scholten et al. |
| 2018/0007136 | A1 | 1/2018 | Scholten et al. |
| 2018/0011481 | A1 | 1/2018 | Smit et al. |
| 2018/0023413 | A1 | 1/2018 | Chowdhury et al. |
| 2018/0023484 | A1 | 1/2018 | Gelwan et al. |
| 2018/0045122 | A1 | 2/2018 | Veilleux |
| 2018/0051587 | A1 | 2/2018 | Fletcher |
| 2018/0167391 | A1* | 6/2018 | Lawson .............. H04L 63/0876 |
| 2018/0170575 | A1 | 6/2018 | Ziarno |
| 2018/0205658 | A1 | 7/2018 | Sullivan |
| 2018/0225629 | A1* | 8/2018 | Brodersen .......... G06Q 10/0875 |
| 2018/0297718 | A1 | 10/2018 | Adibhatla |
| 2018/0365265 | A1* | 12/2018 | Blanc .................. G08G 5/0034 |
| 2019/0005744 | A1 | 1/2019 | Curtis et al. |
| 2019/0012853 | A1 | 1/2019 | Scholten et al. |
| 2019/0102162 | A1 | 4/2019 | Pitre et al. |
| 2019/0128191 | A1 | 5/2019 | Moravek et al. |
| 2019/0322299 | A1* | 10/2019 | Mong ................. B61L 15/0036 |
| 2019/0367190 | A1 | 12/2019 | Bewley et al. |
| 2019/0385057 | A1 | 12/2019 | Litichever et al. |
| 2019/0385120 | A1* | 12/2019 | Yund ....................... G06F 16/27 |
| 2020/0044916 | A1 | 2/2020 | Kaufman et al. |
| 2020/0076596 | A1 | 3/2020 | Chopart |
| 2020/0332675 | A1 | 10/2020 | Scheid et al. |
| 2020/0332722 | A1 | 10/2020 | Lamberti et al. |
| 2020/0333004 | A1 | 10/2020 | Scheid et al. |
| 2020/0334925 | A1 | 10/2020 | Scheid et al. |
| 2020/0362766 | A1 | 11/2020 | Lamberti et al. |
| 2020/0378271 | A1 | 12/2020 | Lamberti et al. |
| 2020/0380508 | A1* | 12/2020 | Sheriff ................ G06Q 20/322 |
| 2021/0209868 | A1 | 7/2021 | Scheid et al. |

FOREIGN PATENT DOCUMENTS

| | | |
|---|---|---|
| EP | 3217364 A2 | 9/2017 |
| EP | 3260939 A1 | 12/2017 |
| WO | 2010028729 A1 | 3/2010 |
| WO | 2018158102 A1 | 9/2018 |

OTHER PUBLICATIONS

Extended European Search Report; dated Aug. 24, 2020; EP Application No. 20170086.1-1009; 11 pages.
Extended European Search Report; dated Aug. 24, 2020; Application No. 20167171.6-1202; 8 pages.
Extended European Search Report; dated Sep. 8, 2020; Application No. 20167178.1-1202; 9 pages.
Extended European Search Report; dated Sep. 8, 2020; Application No. 20167253.2-1202; 10 pages.
Extended European Search Report; dated Oct. 2, 2020; Application No. 20170071.3-1202; 11 pagaes.
Extended European Search Report; dated Sep. 25, 2020; Application No. 20170066.3-1009; 12 pages.
Extended European Search Report; dated Sep. 18, 2020; Application No. 20167001.5-1009; 9 pages.
Partial European Search Report; Application No. 20170098.6-1202; dated Sep. 21, 2020; 16 pages.
European Office Action for European Application No. Apr. 17, 2020; dated Mar. 3-7, 2022; 4 pages.
U.S. Appl. No. 16/839,108, filed Apr. 3, 2020, NonFinal Office Action, dated Mar. 1, 2022, 48 pages.
Baek et al., "Making air traffic surveillance more reliable: a new authentication framework for automatic dependent surveillance-broadcast (ADS-B) based on online/offiline identity-based signature", Security Comm. Networks 2015; 8: 740-750.

* cited by examiner

GAS TURBINE ENGINE CONFIGURATION DATA SYNCHRONIZATION WITH A GROUND-BASED SYSTEM

CROSS-REFERENCE TO RELATED APPLICATIONS

This application claims the benefit of priority to U.S. Provisional Application No. 62/835,169 filed Apr. 17, 2019, the disclosure of which is incorporated by reference herein in its entirety.

BACKGROUND

The subject matter disclosed herein generally relates to gas turbine engine communication systems and, more particularly, to a gas turbine engine having wireless configuration data synchronization capability with a ground-based system.

A control system of a gas turbine engine uses multiple configuration control items, such as control software, data, trim updatable values, and the like to control operation of the gas turbine engine and monitor performance of the gas turbine engine. Once a gas turbine engine is deployed in the field, it can be difficult to access data captured and/or computed by the control system and to make updates to the configuration control items. A gas turbine engine can be deployed in the field for an extended service life, such as a period of decades. Computer system technology and communication technology can evolve at a rapid pace adding to the challenges of interfacing with offboard systems as the offboard technology continues to advance during the lifespan of the engine.

Across a fleet of aircraft, modifications and updates can take place at different times. As updated service bulletins are released to make specific updates to certain components of an aircraft, the updates may not be uniformly applied at the same time, which can result in variability when attempting to understand a current configuration of a particular component or an aircraft including multiple components.

BRIEF DESCRIPTION

According to one embodiment, a system includes an engine manufacturer database communicatively coupled to a blockchain database through a network and a ground station configured to wirelessly communicate with a communication adapter of a gas turbine engine of an aircraft. The communication adapter includes a communication interface configured to communicate with an engine control of a gas turbine engine of the aircraft. The system is further configured to monitor the blockchain database for a configuration update associated with the aircraft and update the engine manufacturer database based on the configuration update associated with the aircraft including the gas turbine engine tracked by the engine manufacturer database. The system is further configured to command a synchronization of the configuration update from the engine manufacturer database to a communication adapter of the gas turbine engine tracked by the engine manufacturer database and transmit the configuration update wirelessly to the communication adapter through the communication interface to update a data storage unit of the gas turbine engine with the configuration update.

In addition to one or more of the features described above or below, or as an alternative, further embodiments may include where the blockchain database is coupled through the network to an airline database that is modified to reflect the configuration update.

In addition to one or more of the features described above or below, or as an alternative, further embodiments may include where updates to the airline database tag aircraft data that is pushed to the blockchain database as the configuration update.

In addition to one or more of the features described above or below, or as an alternative, further embodiments may include where the network includes a first firewall between the engine manufacturer database and the blockchain database, and the network further includes a second firewall between the blockchain database and the airline database.

In addition to one or more of the features described above or below, or as an alternative, further embodiments may include where the data storage unit is communicatively coupled the engine control, and the engine control is configured to update the data storage unit through the communication adapter.

In addition to one or more of the features described above or below, or as an alternative, further embodiments may include where the data storage unit is configured to store a plurality of records indicative of incorporation of service bulletins for the gas turbine engine.

In addition to one or more of the features described above or below, or as an alternative, further embodiments may include where the blockchain database is updated based on a confirmation of updating the data storage unit.

According to an embodiment, a method includes monitoring a blockchain database accessible through a network for a configuration update associated with an aircraft and updating an engine manufacturer database based on the configuration update associated with the aircraft including a gas turbine engine tracked by the engine manufacturer database. The method further includes commanding a synchronization of the configuration update from the engine manufacturer database to a communication adapter of the gas turbine engine tracked by the engine manufacturer database, and transmitting the configuration update wirelessly to the communication adapter through a communication interface to update a data storage unit of the gas turbine engine with the configuration update.

According to an embodiment, a gas turbine engine of an aircraft includes a fan section with a fan case, an engine control mounted on the fan case, and a communication adapter mounted on the fan case. The engine control is configured to monitor and control operation of the gas turbine engine in real-time. The communication adapter includes processing circuitry configured to synchronize a configuration update from an engine manufacturer database through wireless communication with an offboard system and update a data storage unit of the gas turbine engine with the configuration update.

In addition to one or more of the features described above or below, or as an alternative, further embodiments may include where a blockchain database is coupled through a network to the engine manufacturer database and an airline database that is modified to reflect the configuration update, and the configuration update is detected based on monitoring of the blockchain database.

A technical effect of the apparatus, systems and methods is achieved by incorporating communication features to perform wireless synchronization of configuration data associated with a gas turbine engine using a ground-based system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
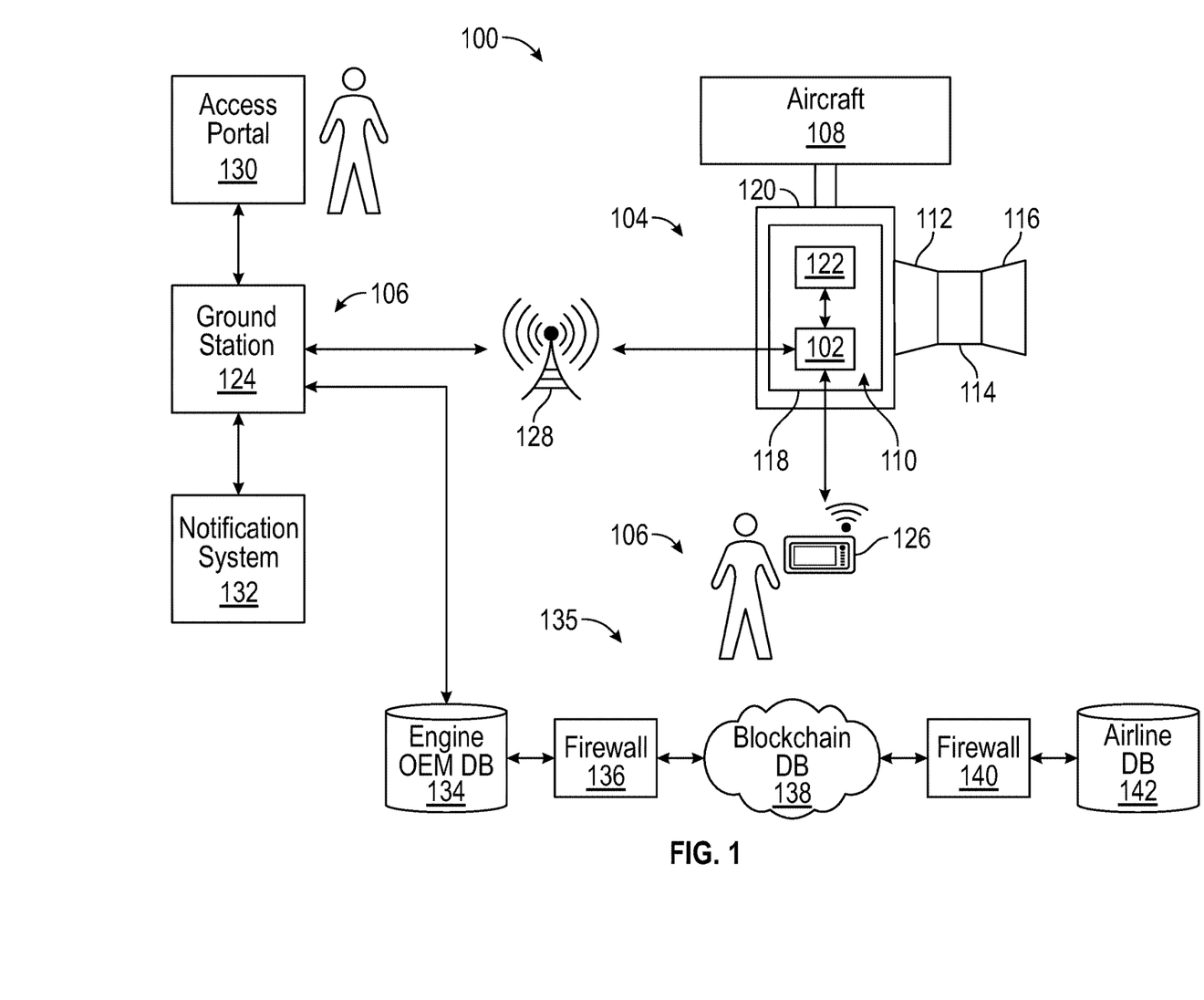
FIG. 1 is a block diagram of a system supporting wireless communication between an engine and offboard systems, in accordance with an embodiment of the disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and flow into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118 and covered by the cowling 120. The engine control 122 is configured to monitor and control operation of the gas turbine engine 104 in real-time. In order to transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the communication adapter 102, also referred to as a gas turbine engine communication gateway, is configured to establish communication with the engine control 122 and wireless communication with one or more offboard systems 106 external to the aircraft 108. Similar to the engine control 122, the communication adapter 102 can be mounted on the fan case 118 and covered by the cowling 120 of the gas turbine engine 104. Wireless communication can alleviate the need for customized cables or physically opening the cowling 120 to establish communication with the offboard systems 106.

The offboard systems 106 can include, for example, a ground station 124, a near-wing maintenance computer 126, an access portal 130, and/or other devices (not depicted) that may establish one-way or two-way wireless communication with the communication adapter 102. For example, a global positioning system (GPS) can provide one-way wireless signaling to the communication adapter 102 to assist in confirming a geographic location of the gas turbine engine 104 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. Wireless communication between the communication adapter 102 and the offboard systems 106 can be direct or indirect. For instance, wireless communication between the communication adapter 102 and ground station 124 may pass through one or more network interface components 128, such as a repeater, while wireless communication between the communication adapter 102 and the near-wing maintenance computer 126 may be direct wireless communication without any relay components.

The ground station 124 can enable communication with a variety of support systems, such as an access portal 130 that enables authorized users to access data, initiate tests, configure software, and perform other actions with respect to the engine control 122, where the communication adapter 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the communication adapter 102 for fault data, test parameters, and other such information. In some embodiments, the near-wing maintenance computer 126 can be authorized with limited authority to make updates to select configuration parameters, software executable or data collection parameters of the communication adapter 102.

In embodiments, the ground station 124 and/or other offboard systems 106 of the system 100 can support communication with an engine manufacturer database 134 communicatively coupled to a blockchain database 138 through a network 135. The engine manufacturer database 134 can track configuration details and files specific to particular instances of the gas turbine engine 104 as deployed in the field. The blockchain database 138 can include a growing list of records, called blocks, which are linked using cryptography to track maintenance actions across a fleet of the aircraft 108. Each block in the blockchain database 138 can include a cryptographic hash of the previous block, a timestamp, and transaction data (e.g., configuration update records), for example. The blockchain database 138 can be coupled through the network 135 to an airline database 142 that is modified to reflect a configuration update, e.g., as made by a maintenance crew of an operator of the aircraft 108. Configuration updates can be managed as requests to perform work and confirmation that work has been performed. The blockchain database 138 can act as a shared ledger to pass updates and status information between multiple parties and systems. The network 135 can include a first firewall 136 between the engine manufacturer database 134 and the blockchain database 138, and the network 135 can further include a second firewall 140 between the blockchain database 138 and the airline database 142.

One or more components of the system 100, such as the ground station 124 or other computer systems, can monitor the blockchain database 138 to detect the configuration update associated with the aircraft 108 associated with a maintenance activity with engine 104. The engine manufacturer database 134 can be updated based on the configuration update associated with the aircraft 108 including the gas turbine engine 104 tracked by the engine manufacturer database 134. A synchronization of the configuration update can be commanded from the engine manufacturer database 134 or a push update from the blockchain database 138 based on the engine manufacture database subscription to the blockchain database 138 to the communication adapter 102 of the gas turbine engine 104 and tracked by the engine manufacturer database 134. The configuration update can be transmitted wirelessly to the communication adapter 102 through a communication interface to update a data storage unit of the gas turbine engine 104 with the configuration update.

Figure 2:
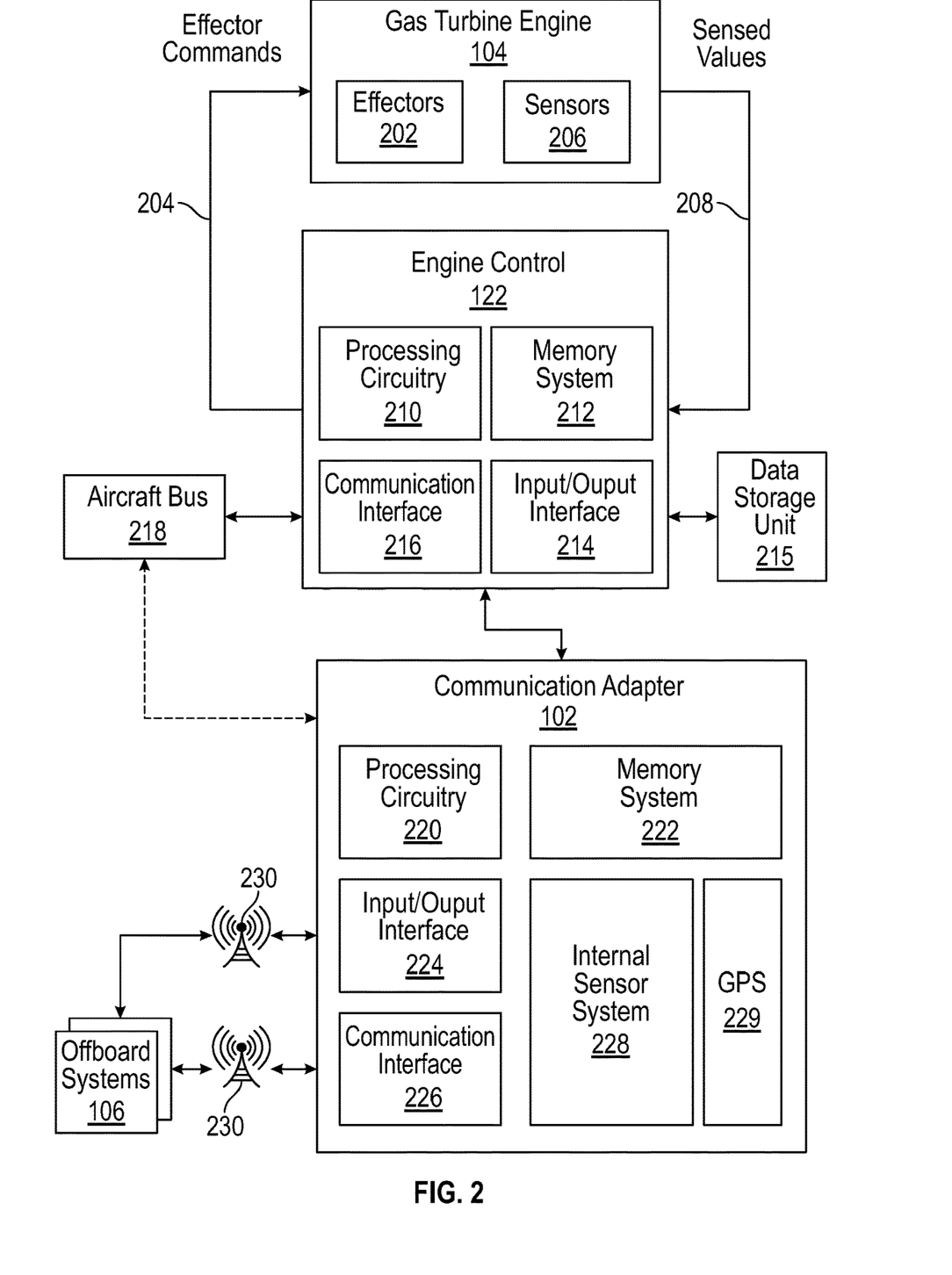
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to enable closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include but are not limited to data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

In some embodiments, a data storage unit 215 may interface with the engine control 122. The data storage unit 215 can include various types of fault records, configuration data, and/or other information specific to a current configuration of the system 100. The data storage unit 215 can appear to the engine control 122 as a portion of addresses as an extension of the memory system 212 and may be in close physical proximity to the engine control 122 (e.g., physically coupled together).

The engine control 122 can also include one or more of an input/output interface 214, a communication interface 216, and/or other elements (not depicted). The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), hard disk drive, and/or other electronic, optical, magnetic, or any other computer readable medium onto which is stored data and algorithms in a non-transitory form. The memory system 222 can be selectively encrypted or otherwise secured to limit unauthorized read and write operations. The communication adapter 102 can also include an internal sensor system 228. The internal sensor system 228 can include, for example, one or more accelerometers, gyroscopes, barometers, a magnetometer (e.g., a compass), and other such sensors. Further, the communication adapter 102 can include other devices, such as a GPS receiver 229. The input/output interface 224 can process data collected from the internal sensors 228 and condition the data in a format usable by the processing circuitry 220. The communication interface 226 can interface with one or more antennas 230, which may be integrated with the communication adapter 102 or located remotely from the communication adapter 102, e.g., a shark-fin antenna mounted under or on the cowling 120 of FIG. 1. Although depicted separately in FIGS. 1 and 2, in some embodiments the engine control 122 and communication adapter 102 can be combined, for instance, where the communication adapter 102 is a module or processing core within the engine control 122.

The communication adapter 102 can act as a secure communication gateway with respect to the offboard systems 106. For example, the offboard systems 106 can request to load new/updated configuration items to the memory system 212 of the engine control 122 through the communication adapter 102. The communication interface 216 of the engine control 122 can interface to the communication interface 226 of the communication adapter 102 through a wired, optical, or magnetic coupling. The communication interface 226 can communicate wirelessly through one or more antennas 230 to the offboard systems 106. The communication interface 226 may also have access to receive data directly from the aircraft bus 218 in some embodiments.

In alternate embodiments, the communication adapter 102 can send a request to the engine control 122 to provide aircraft parameters received via the aircraft bus 218 and/or engine parameters computed by the engine control 122.

The communication adapter 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212.

Configuration items received for the engine control 122 and/or the communication adapter 102 may be encrypted using various cryptographic methods to further enhance security. For example, the communication adapter 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication adapter 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control 122 upon authentication.

Separating the communication adapter 102 from the engine control 122 can enable the communication adapter 102 and the engine control 122 to have different expected service life durations. For example, to stay compatible with changes in wireless communication technologies used by the offboard systems 106, the communication adapter 102 may be upgraded at a faster interval than the engine control 122. The communication adapter 102 can have a lower processing and storage capacity than the engine control 122 to reduce power requirements, weight, and other costs associated with the communication adapter 102. Since the communication adapter 102 does not actively control the gas turbine engine 104, development cycles may be reduced as compared to implementing flight critical control algorithms and hardware of the engine control 122.

Figure 3:
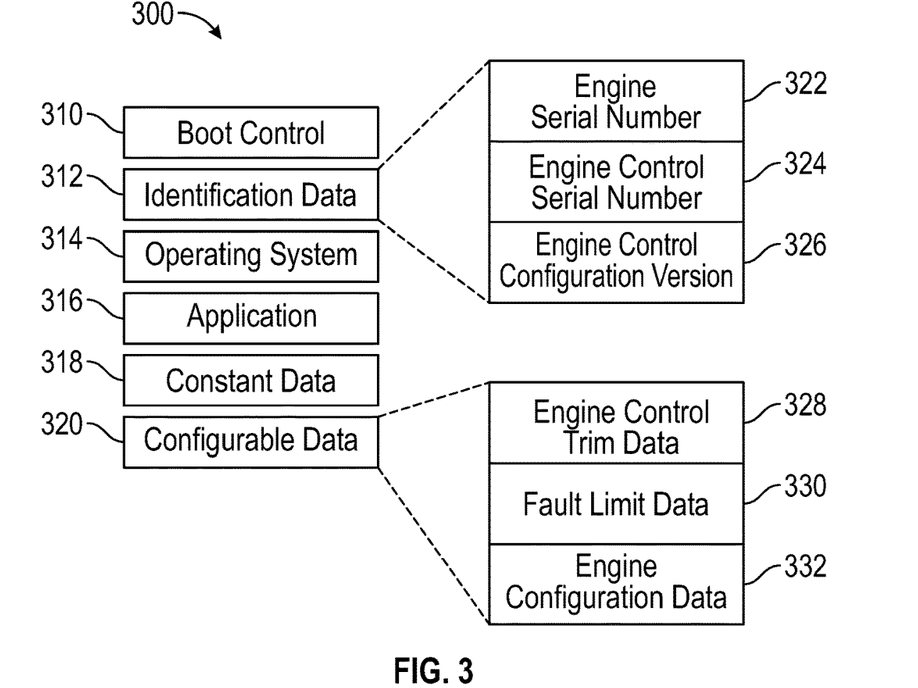
FIG. 3 is a block diagram of configuration items of an engine control, in accordance with an embodiment of the disclosure.

FIG. 3 is a block diagram of configuration items 300 of the engine control 122 of FIG. 1, in accordance with an embodiment of the disclosure. The configuration items 300 can include one or more of a boot control 310, identification data 312, an operating system 314, an application 316, constant data 318, and/or configurable data 320. Further, there can be multiple instances of the configuration items 300, such as multiple instances of the application 316, constant data 318, configurable data 320, and/or other items. The configuration items 300 can have different levels of criticality and authentication required. The boot control 310 can manage the loading and/or initialization of other configuration items 300. The identification data 312 can define a number of configuration identifiers to confirm items such as an engine serial number 322, an engine control serial number 324, an engine control configuration version 326, and other such identifiers. The operating system 314 can provide scheduling and support for one or more applications 316 to interface with various hardware elements of the engine control 122 of FIG. 1. One or more applications 316 that use constant data 318 and/or configurable data 320 can be invoked by the operating system 314. The application 316 can be, for example, configured to control operation of the gas turbine engine 104 of FIG. 1. The configurable data 320 can include adjustable parameters to tune monitoring performance and control performance of the engine control 122, such as engine control trim data 328 and fault limit data 330, engine configuration data and other such configurable items. In embodiments, a subset of the configuration items 300 can be stored in memory devices of the memory system 212 of FIG. 2 that are internal or external to the engine control 122. For example, the memory system 212 can include supplemental data storage, such as a data storage unit or programming plug to store configuration information, such as the identification data 312 and/or the configurable data 320. Supplemental data storage can be accessed through an alternate memory interface, such as a serial interface of the engine control 122 rather than a primary memory bus of the engine control 122 that may be used to access executable instructions of the configuration items 300 and/or various types of data.

Portions of the configuration items 300 may be stored within the data storage unit 215 of FIG. 2. For example, identification data 312 and configurable data 320 may be stored in the data storage unit 215 along with other types of records. The boot control 310 and/or operating system 314 can establish security protocols to reduce the risk of external threats from making unauthorized accesses or updates to the configuration items 300 and/or other items.

Figure 4:
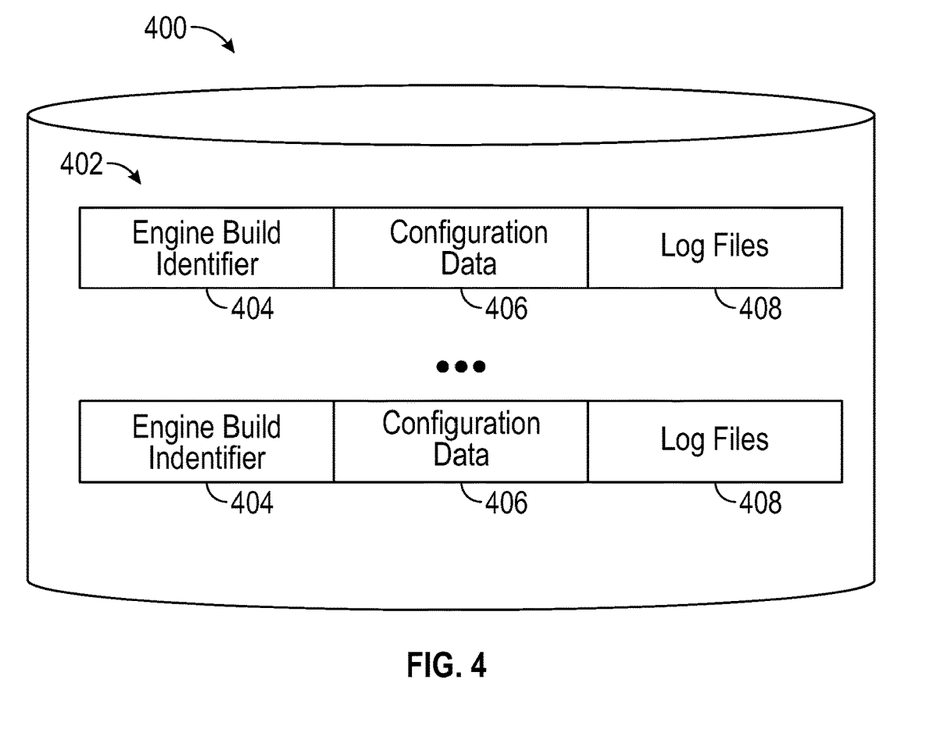
FIG. 4 is a block diagram of a configuration management database of an offboard system to track multiple engine configurations, in accordance with an embodiment of the disclosure.

FIG. 4 is a block diagram of a configuration management database 400 of an offboard system 106 of FIG. 1 to track multiple engine configurations, in accordance with an embodiment of the disclosure. The configuration management database 400 is an example of the engine manufacturer database 134 of FIG. 1. For example, the configuration management database 400 can be stored at or accessible by the ground station 124 of FIG. 1 to track and verify the configuration of multiple instances of the gas turbine engine 104 of FIG. 1 and/or changes to a specific instance of the gas turbine engine 104 over a period of time. The configuration management database 400 can include, for example, a plurality of configuration records 402 that correlate data such as engine build identifier 404, configuration data 406, and log filed 408. The engine build identifier 404 can identify specific engine configurations and the configuration data 406 can include detailed data and software configuration items. For instance, the configuration data 406 may include copies or links to one or more of the configuration items 300 of FIG. 3 associated with an instance or group of gas turbine engines 104. The log files 408 can include data extracted from the communication adapter 102 of FIG. 1, which may include data locally collected by the communication adapter 102, the engine control 122 of FIG. 1, and/or the aircraft bus 218 of FIG. 2. The configuration data 406 and log files 408 may be access restricted and incorporate various security features, such as authentication requirements, encryption, digital signatures, and the like. Contents of the configuration management database 400 can be synchronized with the data storage unit 215 of FIG. 2.

Figure 5:
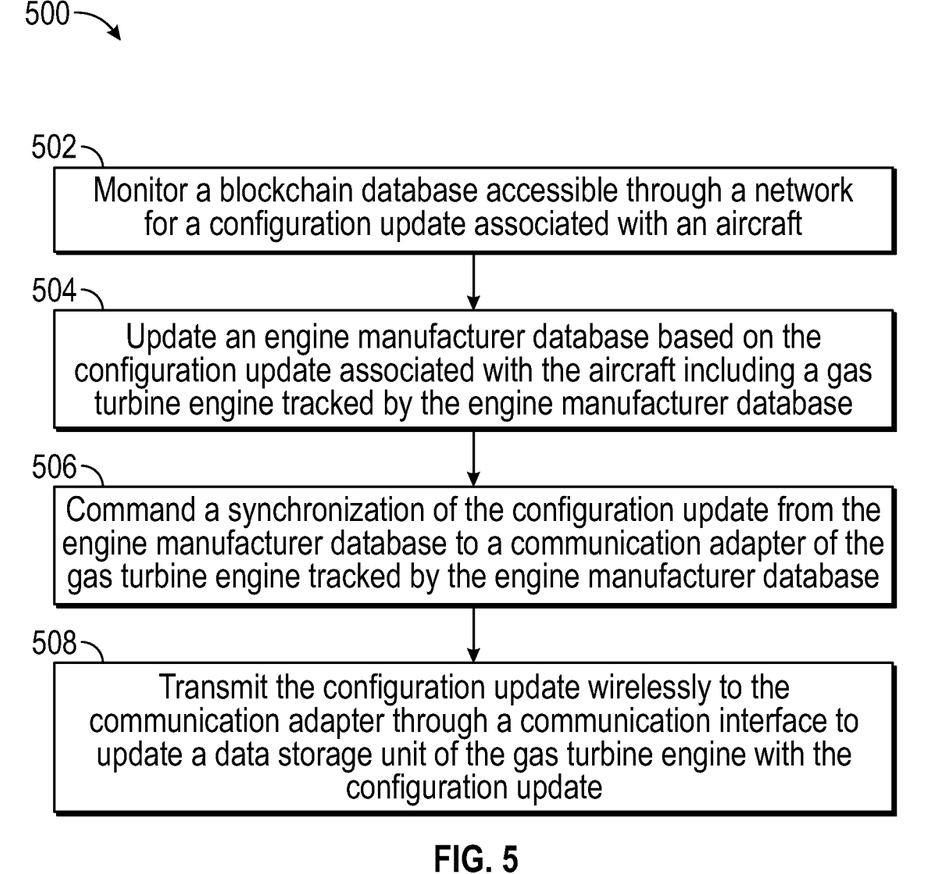
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for performing wireless synchronization of configuration data associated with a gas turbine engine using a offboard (e.g., ground-based) system in accordance with an embodiment. The method 500 may be performed, for example, using the communication adapter 102 in conjunction with the engine control 122 of FIG. 1 and at least one of the offboard systems 106 of FIG. 1.

At block 502, a blockchain database 138 can be made accessible through a network 135 for a configuration update associated with an aircraft 108 associated with maintenance activity with engine 104. The network 135 can enable one of the offboard systems 106 to access configuration update records of the blockchain database 138. In some embodiments, a push notification can be received at one of the offboard systems 106 when an update to the blockchain database 138 is made.

At block 504, the system 100 can update an engine manufacturer database 134 based on the configuration update associated with the aircraft 108 including a gas turbine engine 104 tracked by the engine manufacturer database 134. The update corresponds to changes made in the blockchain database 138. The blockchain database 138 can be coupled through the network 135 to an airline database 142 that is modified to reflect the configuration update. Updates to the airline database 142 can tag aircraft data that is pushed to the blockchain database 138 as the configuration update. The network 135 can include a first firewall between the engine manufacturer database 134 and the blockchain database 138, and the network 135 can further include a second firewall 140 between the blockchain database 138 and the airline database 142.

At block 506, system 100 can command a synchronization of the configuration update from the engine manufacturer database 134 to a communication adapter 102 of the gas turbine engine 104 tracked by the engine manufacturer database 134.

In embodiments, the communication adapter 102 can confirm a system authentication between the communication adapter 102, the engine control 122, and/or an offboard system 106 providing the configuration update. Authentication may include verifying a shared secret or other credential between the communication adapter 102, the engine control 122, and/or the offboard system 106. Further, user type credentials can be used to verify a level of access granted to update specific portions of the memory system 212 and/or data storage unit 215 of the engine control 122. The data storage unit 215 can be communicatively coupled with the engine control 122, and the engine control 122 can be configured to update the data storage unit 215 through the communication adapter 102. The data storage unit 215 can be configured to store a plurality of records indicative of incorporation of service bulletins for the gas turbine engine 104.

At block 508, a transmission of the configuration update can be performed wirelessly from the offboard system 106 to the communication adapter 102 through a communication interface 226 to update the data storage unit 215 of the gas turbine engine 104 with the configuration update.

In some embodiment, the communication adapter 102 can transfer one or more configuration items 300 received at the communication adapter 102 from the offboard system 106 to the engine control 122 based on the system authentication. Examples of the configuration items 300 can include executable software for the engine control 122, such as boot control 310, operating system 314, and/or application 316. Further, the configuration items 300 may include identification data 312, constant data 318, and/or configurable data 320, such as engine control trim data 328 and/or fault limit data 330, engine configuration data 332 and other such data.

The communication adapter 102 can transmit an update completion confirmation of the engine control 122 from the communication adapter 102 to the offboard system 106 based on a confirmation message from the engine control 122. The confirmation message from the engine control 122 can be sent based on validation of at least one digital signature associated with the configuration items 300 prior to updating the engine control 122 and/or the data storage unit 215. For instance, the configuration items 300 to be updated may be digitally signed at the offboard system 106 and the digitally-signed configuration items 300 can pass through the communication adapter 102 after authentication to the engine control 122 for validation. Processing circuitry 220 of the communication adapter 102 can be further configured to transmit a data state of the engine control 122 and a configuration of the engine control 122 to the offboard system 106 with the update completion confirmation. Confirmations may include a success or failure status to assist in troubleshooting unsuccessful upload attempts. The offboard system 106 can store results and state data, such as a load state and configuration, into the engine manufacturer database 134 or configuration management database 400 (e.g., as part of the configuration data 406 and/or log files 408 associated with an engine build identifier 404). The blockchain database 138 can be updated based on a confirmation of updating the data storage unit 215. For instance, a confirmation of an update to the data storage unit 215 can be logged in the engine manufacturer database 134 resulting in an update confirmation message being transmitted to the blockchain database 138.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
an engine manufacturer database communicatively coupled to a blockchain database through a network; and
a ground station that wirelessly communicates with a communication adapter of a gas turbine engine of an aircraft, the communication adapter comprising a communication interface that communicates with an engine control of the gas turbine engine of the aircraft, wherein the system comprises memory that stores a plurality of instructions that when executed by one or more processors results in:
monitoring the blockchain database for a configuration update associated with the aircraft;
updating the engine manufacturer database based on the configuration update associated with the aircraft comprising the gas turbine engine tracked by the engine manufacturer database;
commanding a synchronization of the configuration update from the engine manufacturer database to a communication adapter of the gas turbine engine tracked by the engine manufacturer database;
transmitting the configuration update wirelessly to the communication adapter through the communication interface to update a data storage unit of the gas turbine engine with the configuration update;
receiving a confirmation from the communication adapter with a success or failure status of updating the data storage unit with the configuration update; and
logging the confirmation in the engine manufacturer database, resulting in an update confirmation message being transmitted to the blockchain database based on confirmation of a successful update to the data storage unit.

2. The system of claim 1, wherein the blockchain database is coupled through the network to an airline database that is modified to reflect the configuration update.

3. The system of claim 2, wherein updates to the airline database tag aircraft data that is pushed to the blockchain database as the configuration update.

4. The system of claim 2, wherein the network comprises a first firewall between the engine manufacturer database and the blockchain database, and the network further comprises a second firewall between the blockchain database and the airline database.

5. The system of claim 1, wherein the data storage unit is communicatively coupled to the engine control, and the engine control updates the data storage unit through the communication adapter.

6. The system of claim 1, wherein the data storage unit stores a plurality of records indicative of incorporation of service bulletins for the gas turbine engine.

7. A method comprising:
monitoring a blockchain database accessible through a network for a configuration update associated with an aircraft;
updating an engine manufacturer database based on the configuration update associated with the aircraft comprising a gas turbine engine tracked by the engine manufacturer database;
commanding a synchronization of the configuration update from the engine manufacturer database to a communication adapter of the gas turbine engine tracked by the engine manufacturer database;
transmitting the configuration update wirelessly to the communication adapter through a communication interface to update a data storage unit of the gas turbine engine with the configuration update;
receiving a confirmation from the communication adapter with a success or failure status of updating the data storage unit with the configuration update; and
logging the confirmation in the engine manufacturer database, resulting in an update confirmation message being transmitted to the blockchain database based on confirmation of a successful update to the data storage unit.

8. The method of claim 7, wherein the blockchain database is coupled through the network to an airline database that is modified to reflect the configuration update.

9. The method of claim 8, wherein updates to the airline database tag aircraft data that is pushed to the blockchain database as the configuration update.

10. The method of claim 8, wherein the network comprises a first firewall between the engine manufacturer database and the blockchain database, and the network further comprises a second firewall between the blockchain database and the airline database.

11. The method of claim 7, wherein the data storage unit is communicatively coupled to the engine control, and the engine control updates the data storage unit through the communication adapter.

12. The method of claim 7, wherein the data storage unit stores a plurality of records indicative of incorporation of service bulletins for the gas turbine engine.

13. A gas turbine engine of an aircraft, the gas turbine engine comprising:
a fan section comprising a fan case;
an engine control that monitors and controls operation of the gas turbine engine in real-time;
a data storage unit communicatively coupled to the engine control; and
a communication adapter comprising processing circuitry and a memory system that stores a plurality of instructions that when executed by the processing circuitry results in:
synchronizing a configuration update from an engine manufacturer database through wireless communication with an offboard system;
updating the data storage unit with the configuration update through communication with the engine control; and
transmitting a confirmation with a success or failure status of updating the data storage unit with the configuration update to the offboard system, wherein the confirmation is logged in the engine manufacturer database resulting in an update confirmation message being transmitted to a blockchain database based on confirmation of a successful update to the data storage unit.

14. The gas turbine engine of claim 13, wherein a blockchain database is coupled through a network to the engine manufacturer database and an airline database that is modified to reflect the configuration update, and the configuration update is detected based on monitoring of the blockchain database.

15. The gas turbine engine of claim 14, wherein updates to the airline database tag aircraft data that is pushed to the blockchain database as the configuration update.

16. The gas turbine engine of claim 14, wherein the network comprises a first firewall between the engine manufacturer database and the blockchain database, and the network further comprises a second firewall between the blockchain database and the airline database.

17. The gas turbine engine of claim 13, wherein the data storage unit stores a plurality of records indicative of incorporation of service bulletins for the gas turbine engine.

* * * * *